No. 744,029. PATENTED NOV. 17, 1903.
C. H. BIRDSALL.
GOPHER TRAP.
APPLICATION FILED MAR. 21, 1903.
NO MODEL.
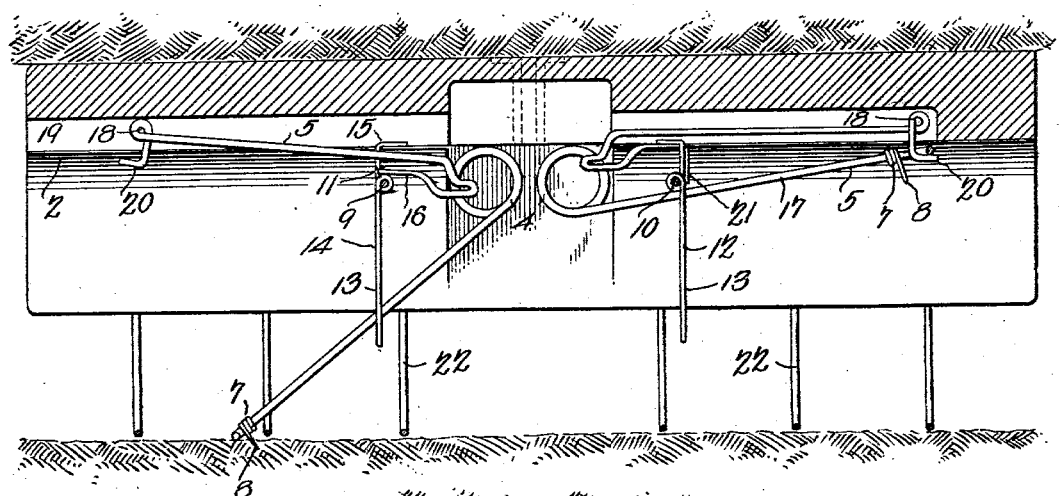
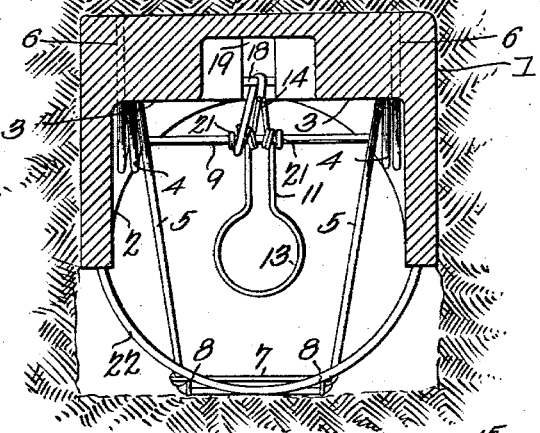
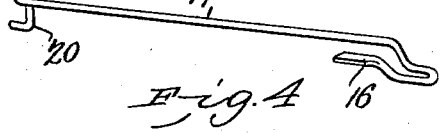
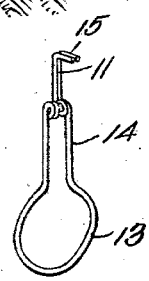
Witnesses
E. F. Stewart
L. N. Acker
C. H. Birdsall, Inventor.
by C. A. Snow & Co.
Attorneys No. 744,029. Patented November 17, 1903.

UNITED STATES PATENT OFFICE.

CHARLES H. BIRDSALL, OF CORONA, CALIFORNIA.

GOPHER-TRAP.

SPECIFICATION forming part of Letters Patent No. 744,029, dated November 17, 1903.

Application filed March 21, 1903. Serial No. 148,973. (No model.)

*To all whom it may concern:*

Be it known that I, CHARLES H. BIRDSALL, a citizen of the United States, residing at Corona, in the county of Riverside and State of California, have invented a new and useful Gopher-Trap, of which the following is a specification.

This invention relates to certain improvements in animal-traps especially adapted for catching gophers, rodents, and other burrowing animals.

The object of the invention is to provide a simple, inexpensive, and efficient device of this character adapted to be placed in the burrow or runway of the animal and so arranged that when the gopher or other animal enters the burrow from either end thereof it will spring the trap, impaling the animal or injuring it to such an extent as to render escape impossible.

A further object of the invention is to provide a trap which is easily set and not liable to be accidentally sprung, the operating mechanism being located at the top of the trap, leaving the burrow or runway unobstructed with the exception of the operating-trigger.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, Figure 1 is a longitudinal sectional view of a trap constructed in accordance with my invention. Fig. 2 is a transverse sectional elevation of the same. Fig. 3 is a detail perspective view of one of the depending triggers, and Fig. 4 is a similar view of one of the trigger-bars.

Similar numerals of reference indicate corresponding parts in all the figures of the drawings.

1 indicates the frame or body portion, which may be formed of wood, metal, or other suitable material, open at the bottom and provided with a longitudinal bore or channel 2, through which the animal passes and which forms a continuation of the burrow when the trap is placed in the runway.

The inner side walls of the body portion are provided with recesses 3, in which are seated the coil-springs 4 of oppositely-disposed bail-shaped spring-jaws 5, the ends of the coils passing through openings 6 in the body portion, being clenched or otherwise secured thereto. The spring-jaws 5 are provided with cross-bars 7, the ends of the bars being twisted around the opposite sides of the bail and bent to form downwardly-extending spurs or teeth 8, which impale the animal when the trap is sprung, as will be more fully explained hereinafter. Extending across the groove or channel 2 and secured in any suitable manner in the side walls of the body portion are transversely-disposed bars 9 and 10, and loosely mounted on these bars are triggers 11 and 12, which normally extend in the path of the groove or channel and against which the animal strikes in passing through the runway, causing the trap to be sprung. The triggers 11 and 12 each are formed of a single piece of wire bent to form a loop 13 and parallel arms 14, the ends of which encircle the bars 9 and 10, respectively, forming bearings on which the triggers loosely swing, the ends of the wire being bent to form hooks 15. The hooks 15 of the triggers 11 and 12 are oppositely disposed, as shown, and these hooks are adapted to engage the flattened hooked end 16 of longitudinally-disposed trigger-bars 17 when the trap is set. The trigger-bars 17 are pivoted by means of pins 18 in grooves or channels 19, formed in the top of the body portion, and the pivoted ends of said trigger-bars are provided with depending angular arms 20, adapted to engage the spring-jaws and by means of which they are retained in the elevated position. The bars 9 and 10 are provided with pins or lugs 21, arranged one on each side of the triggers 11 and 12, so as to prevent lateral displacement thereof and hold the end of the triggers in the proper position for engagement with the end of the trigger-bars.

A series of downwardly-curved arched wires or rods 22 extend transversely across the bottom of the body of the trap, which support the trap when placed in position in the burrow, one or other of said rods forming a stop for the spring-arms when the trap is sprung, as clearly shown in Fig. 2 of the drawings.

The construction of my device will be readily understood, and the operation is as follows: The trap is set by depressing the spring-jaws 5 and passing the angular arm 20 of the trigger-bar under the end of the jaws and the hooked end of the trigger in engagement with the flattened end of the trigger-bars. The trap is then placed in the burrow or runway with the curved rods 22 resting on the bottom thereof, and should the animal attempt to go through the runway from either end of the same it will come in contact with either the trigger 11 or 12, tripping the same and causing the trigger-bar to release the spring-jaws, which spring downwardly, the teeth or spurs impaling the animal or injuring it to such an extent as to render escape impossible.

From the foregoing description it will be seen that I have provided an animal-trap which is simple in construction and effective in operation, the operating parts being so located as to leave the burrow or runway practically unobstructed.

Having thus described the invention, what I claim, and desire to secure by Letters Patent, is—

1. An animal-trap comprising a hollow frame or body portion provided with a longitudinal groove or channel, a pair of oppositely-disposed downwardly-movable spring-jaws mounted in the body portion, a pair of trigger-bars pivoted within the groove or channel and adapted to engage the spring-jaws, and a pair of depending triggers adapted to engage the trigger-bars.

2. An animal-trap, comprising a hollow frame or body portion provided with a longitudinal groove or channel, a downwardly-movable spring-jaw mounted in the body portion, a trigger-bar pivoted in the groove or channel and engaging the free end of the spring-jaw, and a depending trigger having a hooked end portion pivoted within in the frame and adapted to engage the trigger-bar.

3. An animal-trap comprising a hollow frame or body portion, a recess formed in the side walls of the body portion, a downwardly-movable spring-jaw mounted in said recess, a pivoted trigger-bar adapted to engage the free end of the jaw, a depending pivoted trigger engaging the trigger-bar and a series of rods or bars connecting the side walls of the body portion.

4. An animal-trap comprising a hollow frame or body portion provided with a longitudinal groove or channel, a recess formed in the side walls of the body portion, a downwardly-movable spring-jaw mounted in the recess, a trigger-bar pivoted in the groove or channel and provided at one end with an angular arm adapted to engage the free end of the spring-jaw and at its opposite end with a trigger-engaging hook, and a depending pivoted trigger adapted to engage the hooked end of the trigger-bar.

5. An animal-trap comprising a hollow frame or body portion, a downwardly-movable spring-jaw having its end portion secured to the frame, a trigger-bar pivotally mounted in a groove or channel in the body portion and provided at one end with an angular arm adapted to engage the spring-jaw and at its opposite end with a trigger-engaging hook, a transversely-disposed bar secured to the body portion, a depending trigger having a hooked end portion pivotally mounted on the transverse bar and adapted to engage the hooked end of the trigger-bar, and a series of arched bars extending across the bottom of the body portion.

In testimony that I claim the foregoing as my own I have hereto affixed my signature in the presence of two witnesses.

CHARLES H. BIRDSALL.

Witnesses:
GEO. H. MERRIAM,
BESSIE E. MERRIAM.